(12) United States Patent
Tabata

(10) Patent No.: US 9,441,957 B2
(45) Date of Patent: Sep. 13, 2016

(54) THREE-DIMENSIONAL SHAPE MEASURING APPARATUS

(71) Applicant: YAMAHA HATSUDOKI KABUSHIKI KAISHA, Shizuoka-ken (JP)

(72) Inventor: Nobuaki Tabata, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 201 days.

(21) Appl. No.: 14/261,877

(22) Filed: Apr. 25, 2014

(65) Prior Publication Data

US 2014/0368835 A1 Dec. 18, 2014

(30) Foreign Application Priority Data

Jun. 13, 2013 (JP) .................................. 2013-124349

(51) Int. Cl.
*G01B 11/30* (2006.01)
*G01B 11/25* (2006.01)
*G01B 11/245* (2006.01)

(52) U.S. Cl.
CPC ............. *G01B 11/25* (2013.01); *G01B 11/245* (2013.01)

(58) Field of Classification Search
CPC combination set(s) only.
See application file for complete search history.

(56) References Cited

U.S. PATENT DOCUMENTS 5,629,794 A 5/1997 Magel et al.
7,388,679 B2 6/2008 Yoshino et al.
2004/0125381 A1 7/2004 Chen et al.
2011/0001818 A1 1/2011 Hur et al.
2014/0333898 A1 11/2014 Boate et al.

FOREIGN PATENT DOCUMENTS

| JP | 38-02134 B2 | 7/2006 |
| JP | 2006-250609 A | 9/2006 |
| JP | 2007-071769 A | 3/2007 |
| JP | 2008-020867 A | 1/2008 |
| JP | 2009-204343 A | 9/2009 |
| JP | 47-01948 B2 | 6/2011 |
| JP | 2012-255792 A | 12/2012 |
| KR | 10-2012-0111198 A | 10/2012 |
| KR | 2012-0111198 A | 10/2012 |
| WO | 2013/037050 A1 | 3/2013 |

OTHER PUBLICATIONS

The extended European search report issued by the European Patent Office on Nov. 27, 2014, which corresponds to European Patent Application No. 14001505.8-1558 and is related to U.S. Appl. No. 14/261,877.

(Continued)

*Primary Examiner* — Tri T Ton
(74) *Attorney, Agent, or Firm* — Studebaker & Brackett PC

(57) ABSTRACT

A three-dimensional shape measuring apparatus includes a light source, a digital mirror device applying stripe pattern light alternately including a light portion and a dark portion with which information about the height of an inspection target portion can be acquired by reflecting light emitted from the light source, and an imaging portion imaging the inspection target portion to which the stripe pattern light is applied. The digital mirror device includes a plurality of mirrors arranged in a diamond pattern.

14 Claims, 8 Drawing Sheets

(56) References Cited

OTHER PUBLICATIONS

The partial European search report issued by the European Patent Office on Jun. 26, 2014, which corresponds to EP14001505.8-1558 and is related to U.S. Appl. No. 141261,877.

The First Office Action issued by the State Intellectual Property Office of People's Republic of China on Jul. 5, 2016, which corresponds to Chinese Patent Application No. 201410261780.5 and is related to U.S. Appl. No. 14/261,877; with English language translation.

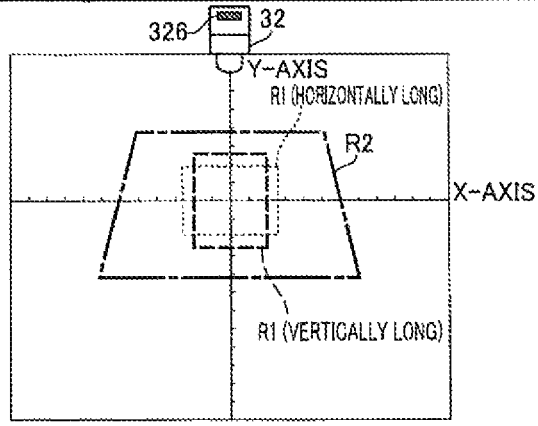
FIG.8 PROJECTION REGION R2 IN CASE WHERE DMD IS NOT ROTATED
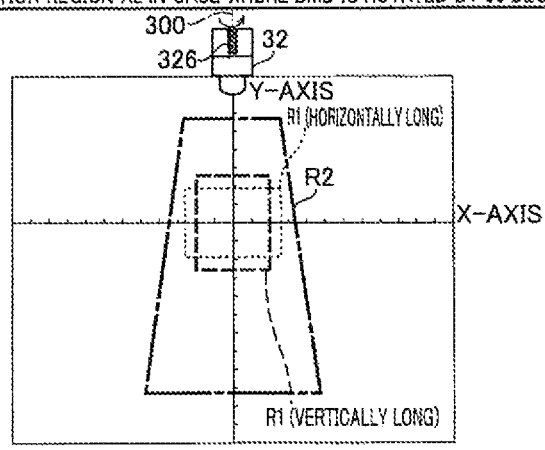
FIG.9 PROJECTION REGION R2 IN CASE WHERE DMD IS ROTATED BY 90 DEGREES
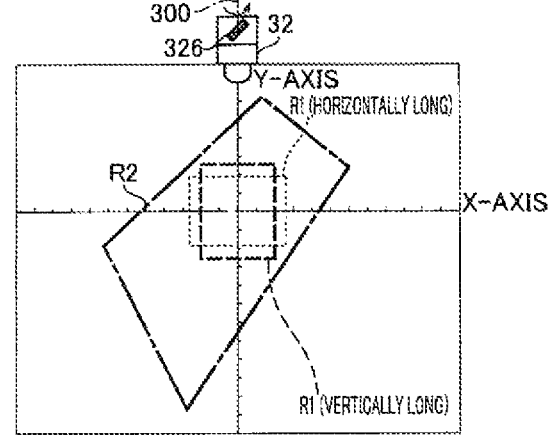
FIG.10 PROJECTION REGION R2 IN CASE WHERE DMD IS ROTATED BY 45 DEGREES FIG.11 PROJECTOR IN WHICH DMD IS ROTATED BY ABOUT 90 DEGREES, BEING ARRANGED AT POSITION A1
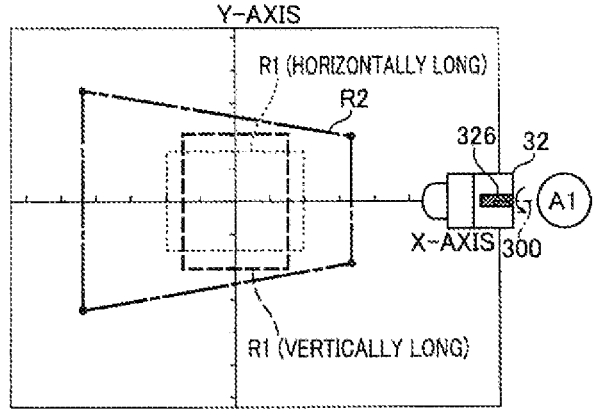
FIG.12 PROJECTOR IN WHICH DMD IS NOT ROTATED, BEING ARRANGED AT POSITION B1
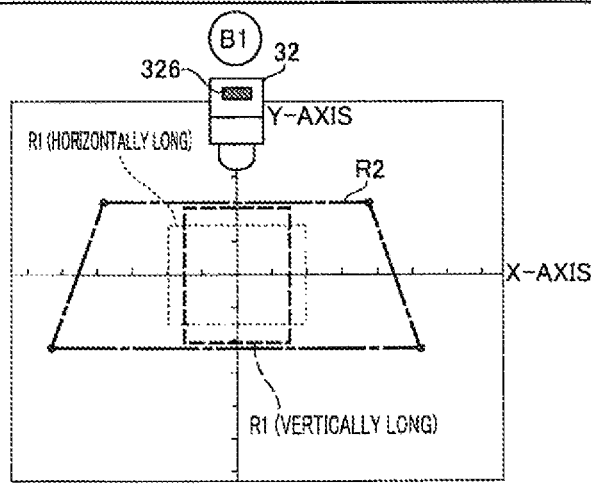
FIG.13 PROJECTOR IN WHICH DMD IS ROTATED BY ABOUT 45 DEGREES, BEING ARRANGED AT POSITION C1
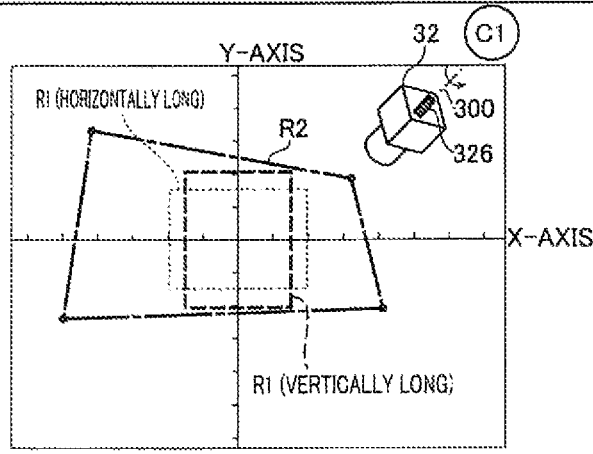

FIG. 14  PITCH OF STRIPE PATTERN LIGHT OF DMD IN NON-ROTATED STATE
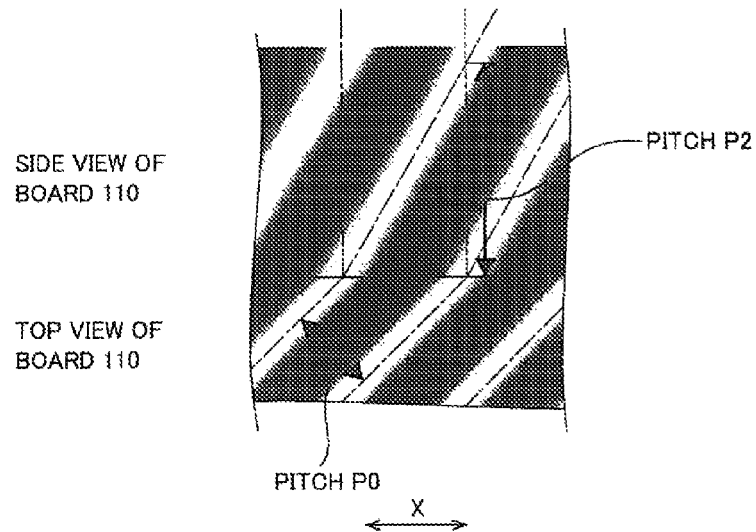
FIG. 15  PITCH OF STRIPE PATTERN LIGHT OF DMD IN ROTATED STATE (ROTATED BY 45 DEGREES)
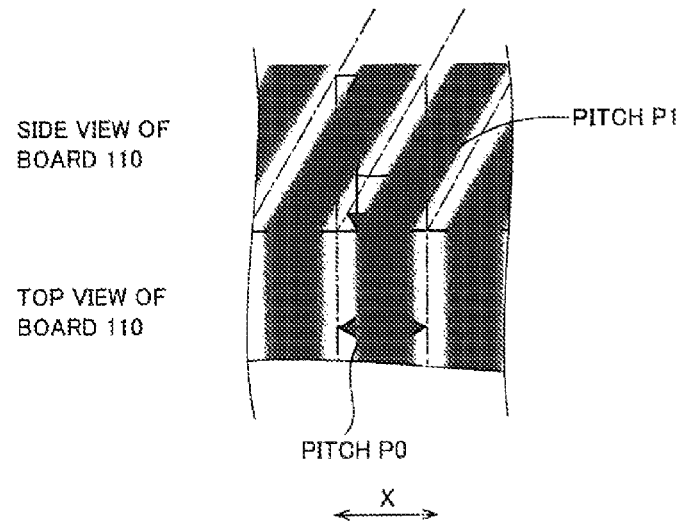

THREE-DIMENSIONAL SHAPE MEASURING APPARATUS

CROSS-REFERENCE TO RELATED APPLICATION

This application claims benefit of priority to Japanese Patent Application 2013-124349 filed on Jun. 13, 2013, the entire content of which is incorporated herein by reference.

TECHNICAL FIELD

The present disclosure relates to a three-dimensional shape measuring apparatus, and more particularly, it relates to a three-dimensional shape measuring apparatus capable of acquiring information about the height of an inspection target portion.

BACKGROUND

A three-dimensional shape measuring apparatus capable of acquiring information about the height of an inspection target portion is known in general. Such a three-dimensional shape measuring apparatus is disclosed in Japanese Patent Laying-Open No. 2009-204343, for example.

The aforementioned Japanese Patent Laying-Open No. 2009-204343 discloses a three-dimensional shape measuring apparatus including a stripe pattern projection portion having a light source and a DMD (digital mirror device) configured to reflect light emitted from the light source and apply stripe pattern light with which information about the height of an inspection target portion can be acquired to the inspection target portion. This three-dimensional shape measuring apparatus includes an imaging portion imaging the inspection target portion with the stripe pattern light emitted from the stripe pattern projection portion. In this DMD, a plurality of mirrors are arranged, and the DMD is configured to apply the stripe pattern light to the inspection target portion by reflecting the light emitted from the light source. The DMD is conceivably arranged to be substantially perpendicular to the traveling direction of the stripe pattern light emitted from the stripe pattern projection portion. Details of the arrangement state of the plurality of mirrors in this DMD are unknown.

Furthermore, a DMD having a quadrilateral outer shape in which a plurality of mirrors are arranged in a lattice pattern (in a grid pattern) (hereinafter referred to as the DMD in the lattice pattern) is known in general. The plurality of mirrors of the DMD in the lattice pattern each are formed in a substantially quadrilateral shape and have swing axes configured to swing the mirrors at positions corresponding to diagonals of the substantially quadrilateral shapes. These swing axes are substantially parallel to each other and are inclined at about 45 degrees with respect to a side (edge) of the DMD. A light source and the DMD are arranged such that the traveling direction of light emitted from the light source is substantially orthogonal to the swing axes of the plurality of mirrors. Therefore, in a three-dimensional shape measuring apparatus employing the DMD in the lattice pattern, the light source must be arranged at a prescribed interval in an oblique direction with respect to a corner of the DMD having the quadrilateral outer shape in a plan view.

In the case where the conventional DMD in the lattice pattern (in the grid pattern) is applied to the three-dimensional shape measuring apparatus described in the aforementioned Japanese Patent Laying-Open No. 2009-204343, however, the light source must be arranged at the prescribed interval in the oblique direction with respect to the corner of the DMD having the quadrilateral outer shape in the plan view, as hereinabove described, whereby the light source protrudes from the installation width of the DMD having the quadrilateral outer shape in the plan view. Consequently, the external dimension of the stripe pattern projection portion (light source unit) including the light source and the DMD is disadvantageously enlarged.

SUMMARY

The present disclosure has been proposed in order to solve the aforementioned problem, and an object of the present disclosure is to provide a three-dimensional shape measuring apparatus capable of suppressing an enlargement of the external dimension of a light source unit including a light source and a digital mirror device.

A three-dimensional shape measuring apparatus according to an aspect of the present disclosure includes a light source, a digital mirror device applying stripe pattern light alternately including a light portion and a dark portion with which information about the height of an inspection target portion can be acquired to the inspection target portion by reflecting light emitted from the light source, and an imaging portion imaging the inspection target portion to which the digital mirror device applies the stripe pattern light, while the digital mirror device includes a plurality of mirrors arranged in a diamond pattern.

As hereinabove described, the three-dimensional shape measuring apparatus according to this aspect of the present disclosure is provided with the digital mirror device including the plurality of mirrors arranged in the diamond pattern, whereby when the light source is arranged with respect to the digital mirror device in the diamond pattern having swing axes of the plurality of mirrors parallel to the side (edge) of the digital mirror device, the traveling direction of the light emitted from the light source can be substantially orthogonal to the swing axes of the plurality of mirrors even in the case where the light source is provided within the range of the installation width of the digital mirror device having a quadrilateral outer shape in a plan view. Consequently, the light emitted from the light source is reflected by the digital mirror device, whereby the stripe pattern light alternately including the light portion and the dark portion can be projected on the inspection target portion. Thus, an increase in the installation width of a light source unit including the light source and the digital mirror device can be suppressed, unlike the case where a digital mirror device in a lattice pattern is employed and the light source is arranged at a position separated at a prescribed interval in an oblique direction with respect to a corner of the digital mirror device having a quadrilateral outer shape in a plan view. Therefore, an increase in the outer dimension of the light source unit including the light source and the digital mirror device can be suppressed.

In the aforementioned three-dimensional shape measuring apparatus according to this aspect, the digital mirror device preferably has a polygonal shape, and the light source is preferably configured to be opposed to a side of the digital mirror device having the polygonal shape, being adjacent to the light source. According to this structure, an increase in the installation width of the light source unit in the extensional direction of the side of the digital mirror device being adjacent to the light source can be suppressed, and hence the increase in the installation width of the light source unit including the light source and the digital mirror device can be more easily suppressed.

In the aforementioned three-dimensional shape measuring apparatus according to this aspect, the digital mirror device is preferably configured to apply the stripe pattern light alternately including the light portion and the dark portion, being inclined at about 45 degrees with respect to the digital mirror device by adjusting the plurality of mirrors. According to this structure, an edge of the stripe pattern light alternately including the light portion and the dark portion can be rendered substantially linear, and hence the accurate stripe pattern light can be generated, unlike the case where stripe pattern light is inclined at an angle (90 degrees, for example) other than about 45 degrees with respect to the digital mirror device. Consequently, the measurement accuracy of the three-dimensional shape measuring apparatus can be improved.

In this case, the digital mirror device and the light source are preferably configured to be rotatable about a normal line substantially perpendicular to reflection surfaces of the plurality of mirrors. According to this structure, a pitch (interval) between adjacent light portions (dark portions) of the stripe pattern light in a height direction in the case where the inspection target portion is viewed from the side surface can be reduced, and hence the resolution (measurement accuracy) of the three-dimensional shape measurement can be improved.

In the aforementioned structure in which the digital mirror device is rotatable about the normal line substantially perpendicular to the reflection surfaces of the plurality of mirrors, the digital mirror device and the light source are preferably configured to be rotatable by about 45 degrees about the normal line. According to this structure, the pitch (interval) between the adjacent light portions (dark portions) of the stripe pattern light in the height direction in the case where the inspection target portion is viewed from the side surface can be reduced while a large change in the shape of a projection region is suppressed.

In the aforementioned structure in which the digital mirror device is rotatable about the normal line substantially perpendicular to the reflection surfaces of the plurality of mirrors, the three-dimensional shape measuring apparatus preferably further includes a projection lens, and the digital mirror device and the light source are preferably configured to be rotatable about the normal line and rotate independently of the projection lens. According to this structure, the digital mirror device and the light source can be rotated about the normal line of the mirrors of the digital mirror device (about a centerline of the projection lens) with respect to the projection lens while the positional relationship between the digital mirror device and the light source is maintained, and hence the digital mirror device and the light source can be rotated about the normal line of the mirrors of the digital mirror device while the positional relationship between the digital mirror device, the projection lens, and the projection region is maintained when the pitch (interval) between the adjacent light portions (dark portions) of the stripe pattern light in the height direction in the case where the inspection target portion is viewed from the side surface is reduced. Thus, the Scheimpflug principle allowing the projection lens to focus on a close object and a distance object simultaneously can be maintained. Consequently, the optical system may not be adjusted even in the case where the digital mirror device and the light source are rotated.

The aforementioned three-dimensional shape measuring apparatus according to this aspect preferably further includes a projector including the light source and the digital mirror device, emitting the stripe pattern light to a prescribed projection region, the plurality of mirrors each are preferably formed in a substantially quadrilateral shape and have swing axes at positions corresponding to diagonals of substantially quadrilateral shapes, a plurality of swing axes are preferably configured to be substantially parallel to each other and be substantially parallel to a side of the digital mirror device opposed to the light source, and the light source and the digital mirror device are preferably arranged such that the traveling direction of the light emitted from the light source is substantially orthogonal to the swing axes of the mirrors. According to this structure, the digital mirror device in the diamond pattern in which the swing axes for swinging the digital mirror device are parallel to the side (edge) of the digital mirror device having a quadrilateral outer shape is provided, whereby the traveling direction of the light emitted from the light source can be substantially orthogonal to the swing axes of the plurality of mirrors. Therefore, the light emitted from the light source is reflected by the digital mirror device, whereby the stripe pattern light can be easily projected on the inspection target portion.

In this case, the three-dimensional shape measuring apparatus preferably further includes a mounting portion configured to mount the digital mirror device and the light source on a projector housing, and the digital mirror device and the light source are preferably mounted on the mounting portion to be rotatable about a normal line and be rotatable independently of the projection lens. According to this structure, the digital mirror device and the light source can be easily rotated about the normal line of the mirrors of the digital mirror device (about the centerline of the projection lens) with respect to the projection lens while the positional relationship between the digital mirror device and the light source is maintained due to the mounting portion.

In the aforementioned structure having the projector emitting the stripe pattern light to the prescribed projection region, the projector preferably has a projection lens, a plurality of projectors are preferably arranged to surround the imaging portion as viewed from above, and each of the plurality of projectors is preferably configured such that at least the projection magnification of the projection lens or the optical axis of the projection lens is set to include an imaging region of the imaging portion in the projection region. According to this structure, all images corresponding to the stripe pattern light emitted from the plurality of projectors can be acquired (without omission) even in the case where the plurality of projectors are arranged.

In the aforementioned structure having the projector emitting the stripe pattern light to the prescribed projection region, the projector preferably has a projection lens, and the projector preferably has the digital mirror device and the projection lens configured to be relatively movable parallel to each other such that the center of the digital mirror device in a plan view and the optical axis of the projection lens are shifted with respect to each other. According to this structure, the relative positions of the digital mirror device and the projection lens are changed, whereby the projection region of the projector can include the imaging region of the imaging portion even in the case where the projection region of the projector and the imaging region of the imaging portion are displaced from each other. Therefore, all the images corresponding to the stripe pattern light emitted from the projector can be easily acquired (without omission).

In the aforementioned structure having the projector emitting the stripe pattern light to the prescribed projection region, the imaging portion is preferably configured to be capable of imaging the inspection target portion in an imaging region having a substantially quadrilateral shape, a plurality of projectors are preferably arranged to surround the imaging portion as viewed from above, and the digital mirror device and the light source of the projector arranged at a position inclined at a prescribed angle with respect to a side of the imaging region of the plurality of projectors are preferably rotated by an angle corresponding to the position inclined at the prescribed angle where the projector is arranged about a normal line substantially perpendicular to reflection surfaces of the plurality of mirrors so as to be arranged. According to this structure, the projection region of the projector can include the imaging region of the imaging portion without increasing the projection magnification of the projection lens, and hence a reduction in the resolution of the stripe pattern light projected on the projection region can be suppressed. Furthermore, the projection region of the projector can include the imaging region of the imaging portion without increasing the projection magnification of the projection lens, and hence a reduction in the luminance of the stripe pattern light projected on the projection region can be suppressed.

In the aforementioned structure in which the imaging portion can image the inspection target portion in the imaging region having the substantially quadrilateral shape, the imaging portion is preferably configured to be capable of imaging the inspection target portion in the imaging region having a substantially rectangular shape, the digital mirror device and the light source are preferably rotated by about 90 degrees about the normal line substantially perpendicular to the reflection surfaces of the plurality of mirrors with respect to the digital mirror device and the light source of the projector arranged at a position opposed to a long side of the imaging region so as to be arranged when the projector is arranged at a position opposed to a short side of the imaging region, and the digital mirror device and the light source are preferably rotated by about 45 degrees about the normal line substantially perpendicular to the reflection surfaces of the plurality of mirrors with respect to the digital mirror device and the light source of the projector arranged at the position opposed to the long side of the imaging region so as to be arranged when the projector is arranged at a position inclined at about 45 degrees with respect to the long side of the imaging region. According to this structure, the digital mirror device and the light source at the prescribed positions are rotated by the prescribed angle (about 45 degrees or about 90 degrees, for example) about the normal line substantially perpendicular to the reflection surfaces of the plurality of mirrors with respect to the digital mirror device and the light source of the projector arranged at the position opposed to the long side of the imaging region, whereby the projection region of the projector can easily include the imaging region of the imaging portion without increasing the projection magnification of the projection lens.

In the aforementioned structure having the projector emitting the stripe pattern light to the prescribed projection region, the digital mirror device is preferably configured to apply the stripe pattern light to the inspection target portion such that the light intensity is larger on a farther side from the projector than on a closer side therefrom. According to this structure, the smaller luminance of the stripe pattern light applied to the projection region on the farther side from the projector than on the closer side therefrom can be suppressed, and hence the luminance of the stripe pattern light on the projection region can be uniform.

In the aforementioned three-dimensional shape measuring apparatus according to this aspect, the digital mirror device is preferably configured to display a black color on a region outside an imaging region of the imaging portion by not applying the stripe pattern light thereto. According to this structure, diffused reflection of the projected stripe pattern light from the projection region around the imaging region can be suppressed, and hence the measurement accuracy of the three-dimensional shape measuring apparatus can be improved.

In the aforementioned structure in which the digital mirror device is rotatable about the normal line substantially perpendicular to the reflection surfaces of the plurality of mirrors, the imaging portion is preferably configured to be capable of changing the position of an imaging region, and the digital mirror device is preferably configured to be rotatable about the normal line such that the projection region includes the imaging region whose position can be changed. According to this structure, even in the case where the position of the imaging region of the imaging portion is changed, the projection region can include the imaging region whose position can be changed by a simple operation of rotating the digital mirror device, and hence all the images corresponding to the stripe pattern light can be easily acquired (without omission).

According to the present disclosure, as hereinabove described, the increase in the outer dimension of the light source unit including the light source and the digital mirror device can be suppressed.

The foregoing and other objects, features, aspects, and advantages of the present disclosure will become more apparent from the following detailed description of the present disclosure when taken in conjunction with the accompanying drawings.

BRIEF DESCRIPTION OF THE DRAWINGS

FIG. 8 is a diagram showing a state where the DMD of the appearance inspecting apparatus according to the embodiment of the present disclosure is not rotated.

FIG. 9 is a diagram showing a state where the DMD of the appearance inspecting apparatus according to the embodiment of the present disclosure is rotated by about 90 degrees.

FIG. 10 is a diagram showing a state where the DMD of the appearance inspecting apparatus according to the embodiment of the present disclosure is rotated by about 45 degrees.

FIG. 11 is a diagram showing a projector arranged at a position A1 of the appearance inspecting apparatus according to the embodiment of the present disclosure;

FIG. 12 is a diagram showing a projector arranged at a position B1 of the appearance inspecting apparatus according to the embodiment of the present disclosure.

FIG. 13 is a diagram showing a projector arranged at a position C1 of the appearance inspecting apparatus according to the embodiment of the present disclosure.

FIG. 14 is a diagram showing an inspection target portion to which stripe pattern light of the DMD in a non-rotated state of the appearance inspecting apparatus according to the embodiment of the present disclosure is applied.

FIG. 15 is a diagram showing the inspection target portion to which the stripe pattern light of the DMD in a rotated state of the appearance inspecting apparatus according to the embodiment of the present disclosure is applied.

DETAILED DESCRIPTION

An embodiment of the present disclosure is hereinafter described with reference to the drawings.

The structure of an appearance inspecting apparatus 100 according to the embodiment of the present disclosure is now described with reference to FIGS. 1 to 18. The appearance inspecting apparatus 100 is an example of the "three-dimensional shape measuring apparatus" in the present disclosure.

Figure 1:
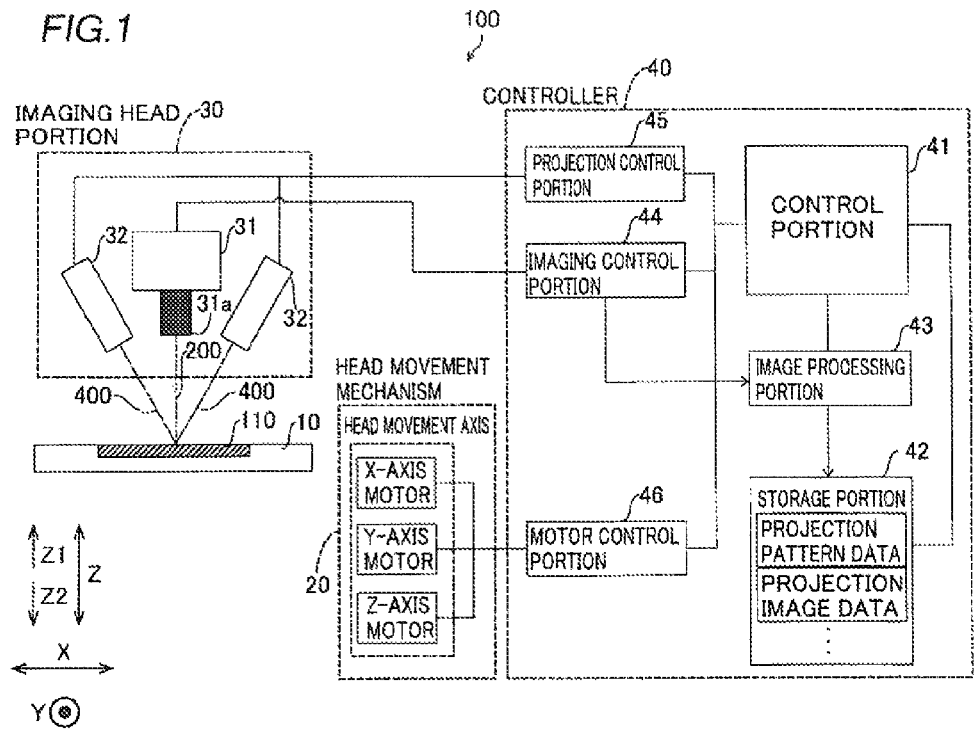
FIG. 1 is a block diagram showing an appearance inspecting apparatus according to an embodiment of the present disclosure.

As shown in FIG. 1, the appearance inspecting apparatus 100 according to this embodiment is an apparatus imaging a printed board (hereinafter referred to as a "board") 110 during manufacturing or after manufacturing in a board manufacturing process as an inspection target portion and performing various inspections on the board 110 and electronic components (not shown) on the board 110. The appearance inspecting apparatus 100 partially constitutes a board manufacturing line for mounting the electronic components on the board 110 to manufacture a circuit board. The board 110 is an example of the "inspection target portion" in the present disclosure.

As a summary of the board manufacturing process, solder (solder paste) is first printed (applied) in a prescribed pattern on the board 110 formed with a wiring pattern by a solder printing apparatus (not shown) (a solder printing step). Then, the electronic components are mounted on the board 110 by a surface mounter (not shown) after the solder printing (a mounting step), whereby terminal portions of the electronic components are arranged on the solder. Thereafter, the board 110 mounted with the electronic components is transferred into a reflow furnace (not shown), and the solder is melted and hardened (cooled) (a reflow step), whereby the terminal portions of the electronic components are bonded with solder to wires of the board 110. Thus, the electronic components are fixed onto the board 110 while being electrically connected to the wires, and board manufacturing is completed.

The appearance inspecting apparatus 100 is employed to inspect the printing state of the solder on the board after the solder printing step, to inspect the mounting state of the electronic components after the mounting step, to inspect the mounting state of the electronic components after the reflow step, or the like, for example. Therefore, one or more appearance inspecting apparatuses 100 are provided in the board manufacturing line. As the printing state of the solder, a printing positional deviation from a design printing position, the shape, volume, and height (application quantity) of the solder, the presence or absence of a bridge (short), etc. are inspected. As the mounting state of the electronic components, whether or not the types and orientations (polarities) of the electronic components are appropriate, whether or not the amount of positional deviation from the design mounting position of the electronic components is within the allowable range, whether or not the solder-bonded states of the terminal portions are normal, etc. are inspected. Furthermore, as common inspection between steps, detection of extraneous material such as dust or another attached substance is also performed.

As shown in FIG. 1, the appearance inspecting apparatus 100 includes a board-conveying conveyor 10 configured to convey the board 110, a head movement mechanism 20 movable in directions X and Y (horizontal directions) and a direction Z (vertical direction) above the board-conveying conveyor 10, an imaging head portion 30 held by the head movement mechanism 20, and a controller 40 controlling the appearance inspecting apparatus 100. The detailed structure of the appearance inspecting apparatus 100 is now described.

The board-conveying conveyor 10 is configured to be capable of conveying the board 110 in the direction X and stopping and holding the board 110 at a prescribed inspection position. Furthermore, the board-conveying conveyor 10 is configured to be capable of conveying the board 110 in the direction X from the prescribed inspection position after the inspection is finished and conveying the board 110 out of the appearance inspecting apparatus 100.

The head movement mechanism 20 is provided above (along arrow Z1) the board-conveying conveyor 10 and includes an orthogonal 3-axis (X-, Y-, and Z-axes) robot employing ball screw shafts and servomotors, for example. The structure of the orthogonal 3-axis robot is publicly known, and hence the detailed description is omitted. The head movement mechanism includes an X-axis motor, a Y-axis motor, and a Z-axis motor configured to drive the imaging head portion 30 along the X-axis, the Y-axis, and the Z-axis. The head movement mechanism 20 is configured such that the X-axis motor, Y-axis motor, and Z-axis motor can move the imaging head portion 30 in the directions X and Y (horizontal directions) and the direction Z (vertical direction) above (along arrow Z1) the board-conveying conveyor 10 (board 110).

The imaging head portion 30 includes an imaging portion 31 and a plurality of projectors 32. This imaging head portion 30 is configured to be moved to a prescribed position above the board 110 by the head movement mechanism 20 and image the board 110, the electronic components on the board 110, etc. for appearance inspection with the imaging portion 31, the projectors 32, etc.

The imaging portion 31 is configured to image the board 110 (inspection target portion) to which stripe pattern light is applied by the projectors 32. The imaging portion 31 is constituted by a CCD camera provided with a lens tube 31*a* holding a lens etc. The imaging portion 31 is configured to be capable of imaging the board 110 (inspection target portion) in an imaging region R1 (see FIG. 2) having a substantially quadrilateral (rectangular) shape that is horizontally long with respect to a conveyance direction (direction X). The imaging portion 31 is configured to capture a two-dimensional image of the upper surface of the board 110 arranged in the imaging region R1 from a substantially vertically upward position. In other words, the imaging region R1 is set to include a position just under the imaging portion 31. This imaging portion 31 captures the two-dimensional image under illumination light emitted from the projectors 32. The imaging portion 31 is configured to be capable of changing a state (horizontally long state) where the imaging region R1 is in the substantially quadrilateral shape that is horizontally long with respect to the conveyance direction (direction X) and a state (vertically long state) where the imaging region R1 is in the substantially quadrilateral shape that is vertically long with respect to the conveyance direction by changing an arrangement orientation about an imaging center, as shown in FIGS. 8 to 10.

Figure 2:
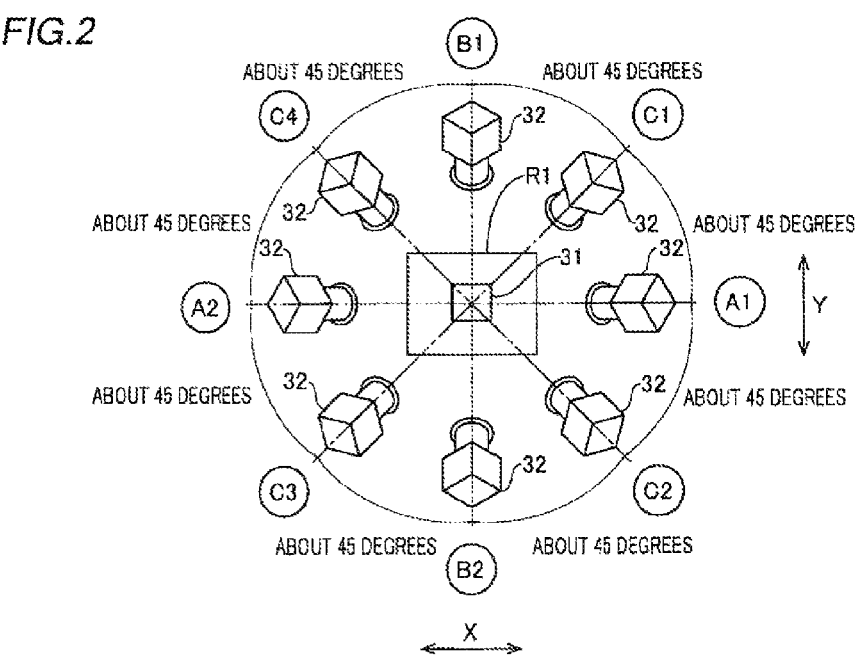
FIG. 2 is a diagram showing the arrangement of projectors of the appearance inspecting apparatus according to the embodiment of the present disclosure.

The plurality of (eight) projectors 32 are arranged to surround the imaging portion 31 as viewed from above, as shown in FIG. 2. The eight projectors 32 are arranged at substantially regular angular (about 45 degrees) intervals at positions equidistant from the imaging center (imaging portion 31). The projectors 32 are formed at positions inclined at a prescribed angle with respect to an imaging axis 200 passing through the imaging region R1 of the imaging portion 31, as shown in FIG. 1.

Figure 3:
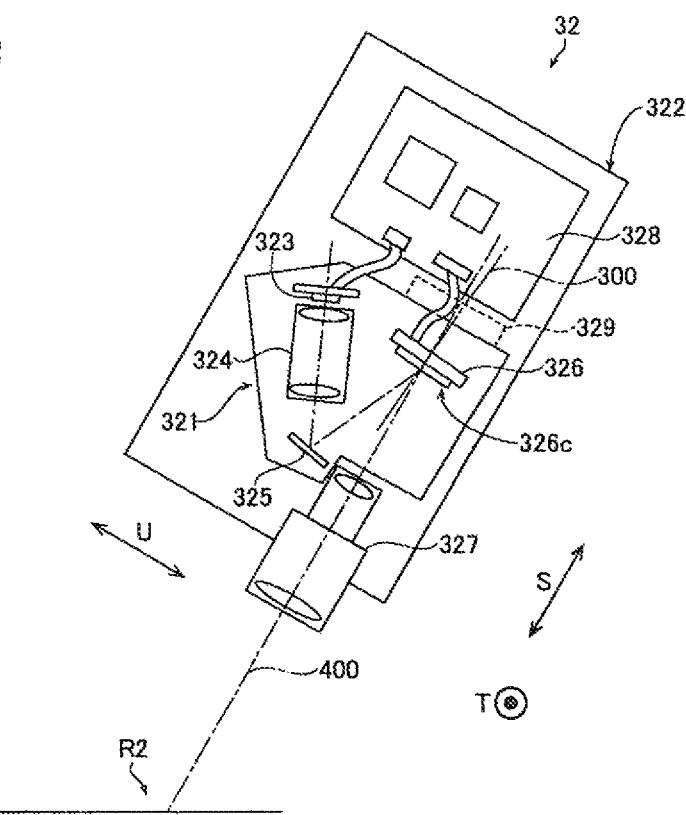
FIG. 3 is a diagram for illustrating the projectors of the appearance inspecting apparatus according to the embodiment of the present disclosure.
Figure 4:
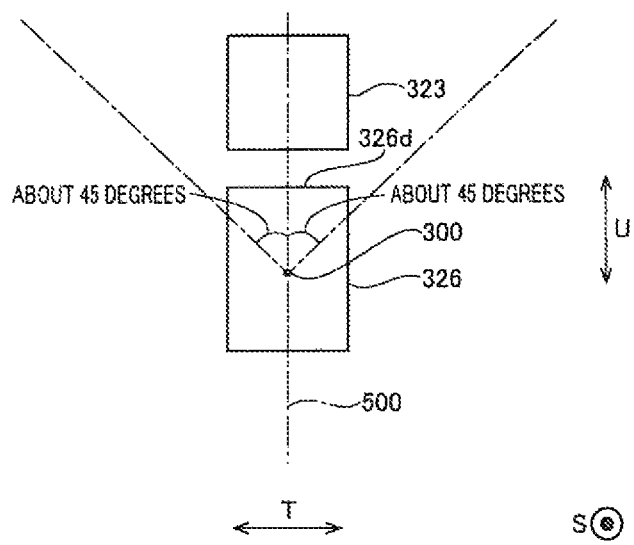
FIG. 4 is a schematic view showing the projectors of the appearance inspecting apparatus according to the embodiment of the present disclosure as viewed along a normal line of a DMD.

According to this embodiment, the projectors 32 each include a light source unit 321, a projector housing 322, a projection lens 327, and a control board 328, as shown in FIG. 3. The light source unit 321 is provided with an LED 323, a condensing lens 324, a mirror 325, and a DMD (registered trademark) (digital mirror device) 326. This light source unit 321 has a fitting portion 329 for mounting on the projector housing 322. The light source unit 321 (the DMD 326 and the LED 323) is mounted on the projector housing 322 by this fitting portion 329. The fitting portion 329 is configured to be capable of rotating and moving the light source unit 321 with respect to the projector housing 322. The DMD 326 and the LED 323 are mounted on the fitting portion 329 to be rotatable about a normal line 300. Specifically, the light source unit 321 is configured to be rotatable by about 90 degrees about the normal line 300 of the DMD 326 independently of the projector housing 322 due to the fitting portion 329. The normal line 300 of the DMD 326 is a concept showing normal lines of reflection surfaces 326*c* of a plurality of mirrors 326*a*, described later, that are not swung in the vicinity of the center of the DMD 326 in a plan view. The light source unit 321 is configured to be rotatable (see FIG. 4) to the right and left by about 45 degrees with respect to a centerline 500 (see FIG. 4) of the DMD 326 about the normal line 300 of the DMD 326. The light source unit 321 is configured to be movable parallel in the extensional direction (direction U) (see FIG. 3) of a lens surface of the projection lens 327 due to the fitting portion 329. The rotation and parallel movement of the light source unit 321 are performed manually. Each portion of the projectors 32 are controlled by the control board 328. The LED 323 is an example of the "light source" in the present disclosure. The fitting portion 329 is an example of the "mounting portion" in the present disclosure.

The LED 323 includes a white LED, for example. Light emitted from the LED 323 is emitted to the DMD 326 through the condensing lens 324 and the mirror 325.

Figure 5:
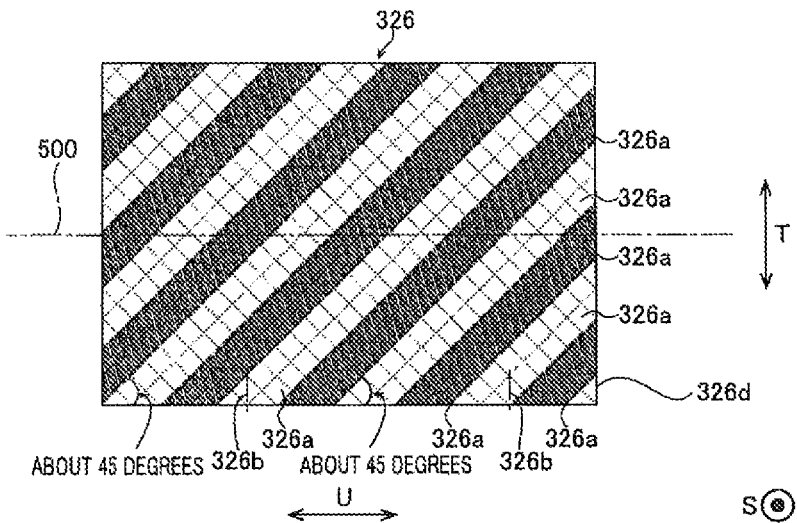
FIG. 5 is a diagram showing the DMD of the appearance inspecting apparatus according to the embodiment of the present disclosure.
Figure 6:
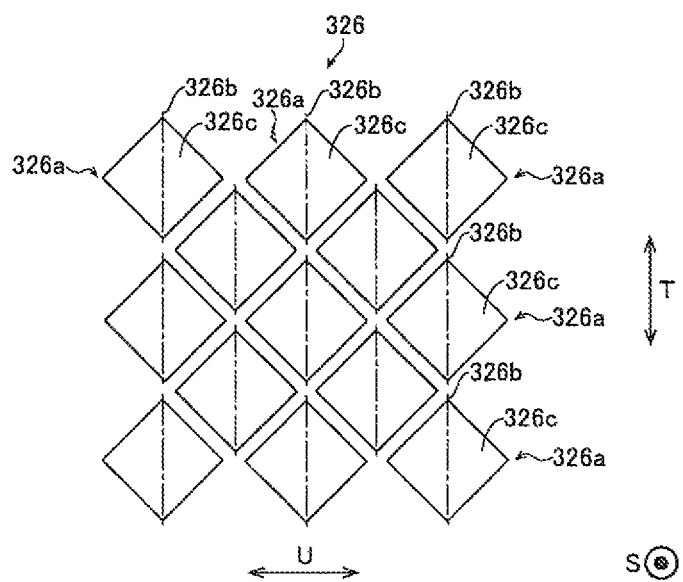
FIG. 6 is an enlarged view of the DMD of the appearance inspecting apparatus according to the embodiment of the present disclosure.

The DMD 326 is configured such that the plurality of mirrors 326*a* (movable micromirrors) capable of being driven individually can be in two inclined states (an on-state and an off-state), as shown in FIGS. 5 and 6. The inclined states of the mirrors 326*a* are controlled, whereby the DMD 326 adjusts the light quantity reflected in a prescribed reflection direction. Thus, the DMD 326 can apply light of arbitrary gradation in the prescribed reflection direction. The DMD 326 is configured to apply the stripe pattern light by reflecting the light emitted from the LED 323. Thus, the projectors 32 can project light of an arbitrary contrasting pattern on the board 110 (projection region R2). The projectors 32 project an equally-spaced lattice-shaped contrasting pattern (stripe pattern light) having sinusoidal light intensity distribution on the board 110 and allow the imaging portion 31 to capture a plurality of images in which the position (phase) of this contrasting pattern is shifted. Thus, a plurality of three-dimensional shape measurement images can be obtained by a phase shift method. Although the details are omitted, the three-dimensional shape (height) of the board 110 can be calculated on the basis of differences between pixel values of the same portions of the obtained plurality of (four, for example) three-dimensional shape measurement images.

According to this embodiment, the DMD 326 includes the plurality of mirrors 326*a* arranged in a diamond pattern. The DMD 326 has a substantially quadrilateral (polygonal) shape in the plan view. The plurality of mirrors 326*a* each are formed in a substantially quadrilateral (square) shape and have a swing axis 326*b* (see FIG. 6) at a position corresponding to a diagonal of the substantially quadrilateral shape. A plurality of swing axes 326*b* are substantially parallel to each other. The plurality of swing axes 326*b* are substantially parallel to a side (edge) 326*d* of the DMD 326 opposed to the LED 323, as shown in FIG. 5. The side 326*d* is substantially parallel to the projection region R2 (imaging region R1). The side (edge) 326*d* of the DMD 326 opposed to the LED 323 is a concept showing such a side that the LED 323 is included (falls) within the range of the width of the side 326*d*. More specifically, the LED 323 is arranged not to protrude from the installation width of the DMD 326, as viewed in a direction along the normal line 300 of the DMD 326. In other words, the LED 323 is configured to be opposed to the side 326*d* of the DMD 326 having the substantially quadrilateral (polygonal) shape, being adjacent to the LED 323. The LED 323 and the DMD 326 are arranged such that the traveling direction (direction S) of the light emitted from the LED 323 is substantially orthogonal to the swing axes 326*b* of the mirrors 326*a*. The DMD 326 is configured to apply the stripe pattern (see FIG. 5) light alternately including light portions and dark portions, being inclined at about 45 degrees with respect to the DMD 326 by adjusting the plurality of mirrors 326*a*. The light source unit 321 is moved, whereby the DMD 326 is moved parallel to the projection lens 327 in the extensional direction (direction U) (see FIG. 3) of the lens surface of the projection lens 327 due to the fitting portion 329.

Figure 7:
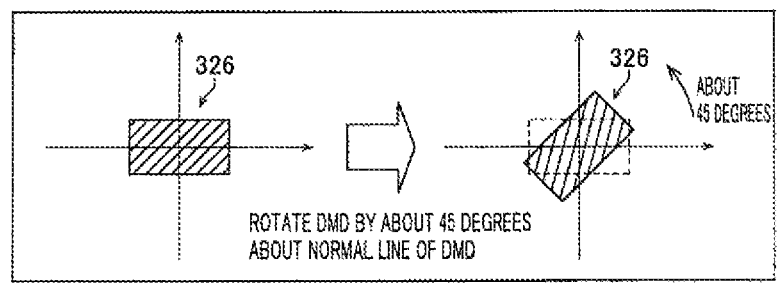
FIG. 7 is a diagram for illustrating a state where the DMD of the appearance inspecting apparatus according to the embodiment of the present disclosure is rotated.

The DMD 326 is configured to be rotatable about the normal line 300 (see FIG. 3) substantially perpendicular to the reflection surfaces 326*c* of the plurality of mirrors 326*a*, as shown in FIG. 7. Specifically, the DMD 326 and the LED 323 are mounted on the fitting portion 329 to be rotatable about the normal line 300 independently of the projection lens 327. More specifically, the light source unit 321 is rotated, whereby the DMD 326 and the LED 323 are rotatable about the normal line 300 independently of the projection lens 327. The DMD 326 and the LED 323 are configured to be rotatable through an angular range of more than 0 degrees and not more than 90 degrees about the normal line 300. The rotation angles of the DMD 326 and the LED 323 are based on (0 degrees) a state where the DMD 326 is arranged to be horizontally long with respect to the projector 32 (see FIGS. 8 and 12). As shown in FIGS. 8 to 10, the light source unit 321 is rotated, whereby the DMD 326 and the LED 323 are rotated by a prescribed angle about the normal line 300, and the shape of the projection region R2 is changed. The projectors 32 (the DMDs 326 and the LEDs 323) each are configured such that the projection region R2 is set to include the imaging region R1 of the imaging portion 31 in both horizontally long and vertically long states. Specifically, a projector 32 has a projection region R2 in a substantially trapezoidal shape, as shown in FIG. 8 when the DMD 326 and the LED 323 thereof are not rotated about the normal line 300. The projector 32 has a projection region R2 in a substantially trapezoidal shape extending in the depth direction of the projection region R2 (along the traveling direction of the light emitted from the projectors 32), as shown in FIG. 9 when the light source unit 321 thereof is rotated to rotate the DMD 326 and the LED 323 counterclockwise by about 90 degrees about the normal line 300. The projector 32 has a projection region R2 in a substantially quadrilateral shape corresponding to the inclination of the DMD 326 and the LED 323 and extending in the depth direction of the projection region R2, as shown in FIG. 10 when the light source unit 321 is rotated to rotate the DMD 326 and the LED 323 counterclockwise by about 45 degrees about the normal line 300. The projection region R2 shown in each of FIGS. 8 to 10 is one that the projector 32 arranged at a position B1 (see FIG. 2) has. Scale marks of the X-axis and the Y-axis of the imaging region R1 (projection region R2) in FIGS. 8 to 13 and 18 show distances from the center (origin) of the imaging region R1 of the imaging portion 31.

According to this embodiment, DMDs 326 and LEDs 323 of two projectors 32 arranged at positions (positions A1 and A2 in FIG. 2) corresponding to the short sides of the horizontally long imaging region R1 of the eight projectors 32 are arranged while being rotated by about 90 degrees about the normal line 300 substantially perpendicular to the reflection surfaces 326c of the plurality of mirrors 326a, as shown in FIG. 11. In other words, the DMDs 326 and the LEDs 323 are rotated by about 90 degrees about the normal line 300 substantially perpendicular to the reflection surfaces 326c of the plurality of mirrors 326a with respect to DMDs 326 and LEDs 323 of projectors 32 arranged at positions B1 and B2 opposed to each other on the long sides of the imaging region R1 so as to be arranged when the projectors 32 are arranged at the positions A1 and A2 opposed to each other on the short sides of the imaging region R1. In this case, the projector 32 arranged at the position A1 has a projection region R2 obtained by rotating the projection region R2 (see FIG. 9) in the substantially trapezoidal shape extending in the depth direction of the projector 32 arranged at the position B1 clockwise by about 90 degrees. The projection region R2 in a substantially trapezoidal shape of the projector 32 arranged at the position A1 includes the horizontally long and vertically long imaging regions R1 of the imaging portion 31. A projection region R2 of the projector 32 arranged at the position A2 is line-symmetrical to the projection region R2 of the projector 32 arranged at the position A1 about the Y-axis of the imaging region R1 (projection region R2).

As shown in FIG. 12, the DMDs 326 and the LEDs 323 of the two projectors 32 arranged at the positions (positions B1 and B2 in FIG. 2) corresponding to the long sides of the imaging region R1 of the eight projectors 32 are arranged while not rotated about the normal line 300 substantially perpendicular to the reflection surfaces 326c of the plurality of mirrors 326a. In this case, the projector 32 arranged at the position B1 has the projection region R2 in the substantially trapezoidal shape extending in the depth direction. The projection region R2 in the substantially trapezoidal shape of the projector 32 arranged at the position B1 includes the horizontally long and vertically long imaging regions R1 of the imaging portion 31. A projection region R2 of the projector 32 arranged at the position B2 is line-symmetrical to the projection region R2 of the projector 32 arranged at the position B1 about the X-axis of the imaging region R1 (projection region R2).

As shown in FIG. 13, DMDs 326 and LEDs 323 of four projectors 32 arranged at positions (positions C1 to C4 in FIG. 2) inclined at 45 degrees with respect to sides of the imaging region R1 of the eight projectors 32 are rotated by about 45 degrees about the normal line 300 substantially perpendicular to the plurality of mirrors 326a so as to be arranged. In other words, the DMDs 326 and the LEDs 323 are rotated by about 45 degrees about the normal line 300 substantially perpendicular to the reflection surfaces 326c of the plurality of mirrors 326a with respect to the DMDs 326 and LEDs 323 of the projectors 32 arranged at the positions B1 and B2 opposed to each other on the long sides of the imaging region R1 so as to be arranged when the projectors 32 are arranged at the positions C1 to C4 inclined at about 45 degrees with respect to the long sides of the imaging region R1. In this case, the projector 32 arranged at the position C1 has a projection region R2 in a distorted quadrilateral shape obtained by rotating a projection region R2 in a substantially trapezoidal shape corresponding to the inclination of the DMD 326 and the LED 323 of the projector 32 arranged at the position B1 and extending in the depth direction of the projection region R2 clockwise by about 45 degrees. The projection region R2 of the projector 32 arranged at the position C2 includes the horizontally long and vertically long imaging regions R1 of the imaging portion 31. Projection regions R2 of the projectors 32 arranged at the positions C2 to C4 are obtained by rotating the projection region R2 of the projector 32 arranged at the position C1 clockwise by about 90 degrees, about 180 degrees, and about 270 degrees with respect to the origin of the imaging region R1.

FIGS. 14 and 15 show pitches between the adjacent light portions (dark portions) of the stripe pattern light in a height direction in the case where the board 110 (inspection target portion) is viewed from the side surface. Resolution is defined by these pitches between the light portions (dark portions) in the height direction when three-dimensional measurement is performed. Specifically, in a state where the DMD 326 and the LED 323 are rotated by about 45 degrees about the normal line 300 (rotated state), the pitch (interval) between the light portions (dark portions) of the stripe pattern light is P1 (see FIG. 15). In a state where the DMD 326 and the LED 323 are not rotated about the normal line 300 (non-rotated state), the pitch between the light portions (dark portions) of the stripe pattern light is P2 (see FIG. 14). More specifically, the pitch p0 between the light portions (dark portions) of the stripe pattern light on a projection surface (the upper surface of the board 110) is the same in the rotated state and the non-rotated state. On the other hand, the pitch between the light portions (dark portions) in the conveyance direction (direction X) of the board 110 (i.e. the pitch between the light portions (dark portions) in the height direction (direction Z) in the case where the board 110 is viewed from the side surface) is smaller in the rotated state than in the non-rotated state. In other words, the pitch P1 of the stripe pattern light in the rotated state is smaller than the pitch P2 of the stripe pattern light in the non-rotated state. Thus, in the projectors 32 arranged at the positions C1 to C4 (see FIG. 2) in which the DMD 326 and the LED 323 are in the rotated state, the resolution is improved as compared with the projector 32 in the non-rotated state when the three-dimensional measurement is performed.

Figure 16:
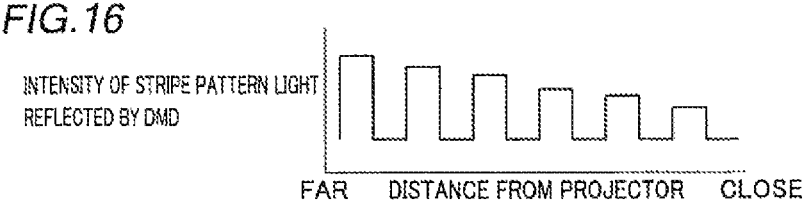
FIG. 16 is a diagram showing the intensity of the stripe pattern light reflected by the DMD of the appearance inspecting apparatus according to the embodiment of the present disclosure.
Figure 17:
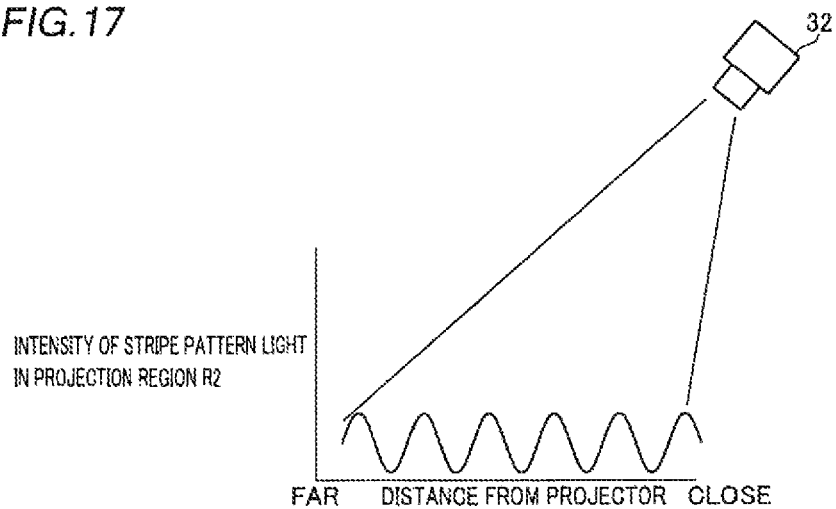
FIG. 17 is a diagram showing the intensity of the stripe pattern light projected on a projection region of the appearance inspecting apparatus according to the embodiment of the present disclosure.

The DMD 326 is configured to apply the stripe pattern light to the board 110 such that the light intensity is larger on a farther side from the projector 32 than on a closer side therefrom by adjusting the swinging of the plurality of mirrors 326a (a duty ratio in the case where the plurality of mirrors 326a are swung, for example), as shown in FIG. 16. Thus, the smaller luminance of the stripe pattern light applied to the projection region R2 on the farther side from the projector 32 than on the closer side therefrom is suppressed, and the luminance of the stripe pattern light is uniform over the projection region R2, as shown in FIG. 17.

Figure 18:
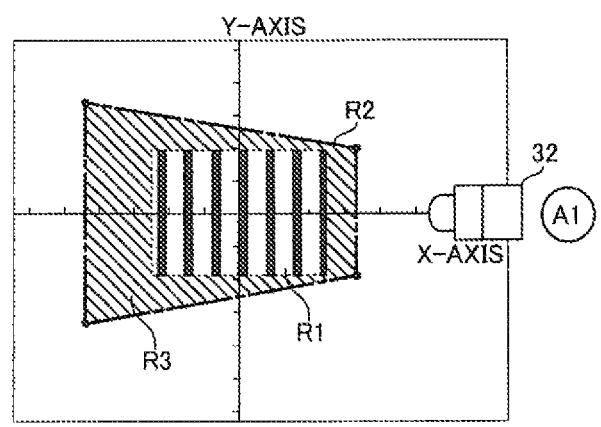
FIG. 18 is a diagram showing a state where the stripe pattern light is not projected on a region around an imaging region of the appearance inspecting apparatus according to the embodiment of the present disclosure.

The DMD 326 is configured to display a black color on a region R3 outside the imaging region R1 of the imaging portion 31 by not applying the stripe pattern light thereto, as shown in FIG. 18. In other words, the projector 32 is configured to project the stripe pattern light on a region substantially coinciding with the imaging region R1 of the imaging portion 31.

As shown in FIGS. 11 to 13, the projection lens 327 is configured to be capable of changing the size (area) of the projection region R2 on which the stripe pattern light is projected. The optical axis 400 of the projection lens 327 of each of the plurality of projectors 32 is set such that the projection region R2 includes the imaging region R1 of the imaging portion 31.

As shown in FIG. 1, the appearance inspecting apparatus 100 is configured to be controlled by the controller 40. The controller 40 includes a control portion 41, a storage portion 42, an image processing portion 43, an imaging control portion 44, a projection control portion 45, and a motor control portion 46.

The control portion 41 is constituted by a CPU performing a logical operation, a ROM (Read Only Memory) storing a program for controlling the CPU etc., a RAM (Random Access Memory) temporarily storing various types of data during the operation of the apparatus, etc. The control portion 41 is configured to control each portion of the appearance inspecting apparatus 100 through the image processing portion 43, the imaging control portion 44, the projection control portion 45, and the motor control portion according to the program stored in the ROM and software (program) stored in the storage portion 42. The control portion 41 performs the aforementioned various appearance inspections on the board 110 with the imaging portion 31 and the projectors 32.

The storage portion 42 includes a non-volatile storage storing various types of data readable by the control portion 41. The storage portion 42 stores image data captured by the imaging portion 31, board data representing the design positional information of the electronic components (not shown) mounted on the board 110, a component shape database defining the shapes of the electronic components (not shown) mounted on the board 110, information about projection patterns (stripe (contrasting) patterns for three-dimensional measurement) generated by the projectors 32, etc. The control portion 41 inspects the solder on the board 110, inspects the mounting state of the electronic components (not shown) mounted on the board 110, and inspects the completed board 110 on the basis of three-dimensional inspection through the three-dimensional shape measurement with the imaging portion 31 and the projectors 32.

The image processing portion 43 is configured to process the image (imaging signal) captured by the imaging portion 31 and generate the image data suitable to recognize (the image of) the electronic components (not shown) and a solder bonded portion (solder) on the board 110.

As shown in FIG. 1, the imaging control portion 44 is configured to retrieve the imaging signal from the imaging portion 31 at the prescribed timing on the basis of a control signal output from the control portion 41 and output the retrieved imaging signal to the image processing portion 43. The projection control portion 45 controls illumination by the projectors 32 on the basis of the control signal output from the control portion 41. When the three-dimensional shape measurement is performed with the projectors 32, the projection control portion 45 controls the projectors 32 to project the illumination light of a plurality of projection patterns in which the phases are shifted a plurality of times (four times, for example) with projection pattern data (pattern data for projecting the stripe pattern light being inclined at about 45 degrees with respect to the DMD 326) stored in the storage portion 42.

The motor control portion 46 is configured to control the driving of servomotors (the X-axis motor, the Y-axis motor, and the Z-axis motor of the head movement mechanism 20, a motor (not shown) configured to drive the board-conveying conveyor 10, etc.) of the appearance inspecting apparatus 100 on the basis of the control signal output from the control portion 41. Furthermore, the motor control portion 46 is configured to acquire the positions of the imaging head portion 30, the board 110, etc. on the basis of signals from encoders (not shown) of the servomotors.

Figure 19:
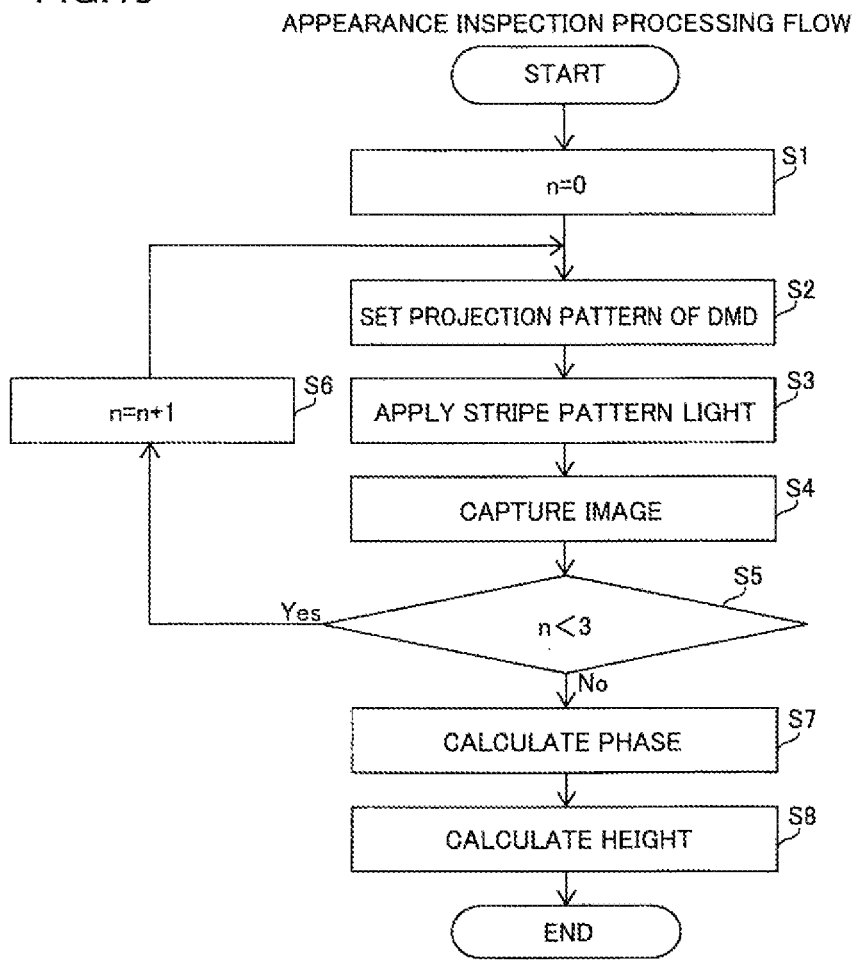
FIG. 19 is a flowchart for illustrating appearance inspection processing of the appearance inspecting apparatus according to the embodiment of the present disclosure.

Appearance inspection processing performed by the control portion 41 of the appearance inspecting apparatus 100 according to this embodiment is now described with reference to FIGS. 5 and 19. An example of acquiring four images in which the phases are shifted by $2\pi/4$ is described here.

First, the control portion 41 sets (resets) the number n of the phase(s) of the stripe pattern light (sinusoidal stripe pattern) to 0 (a state where there is no shift in the phase) at a step S1.

Next, the control portion 41 sets the projection pattern of the DMD 326 at a step S2. Specifically, in the DMD 326, an imaging pattern of the n-th phase pattern of a stripe pattern being inclined at about 45 degrees is set on the basis of information about the projection pattern (the projection pattern data for projecting the stripe pattern light being inclined at about 45 degrees with respect to the DMD 326) retrieved from the storage portion 42. Then, the swing of the plurality of mirrors 326a is controlled so as to form the stripe pattern (see FIG. 5) corresponding to the n-th phase being inclined at about 45 degrees with respect to the DMD 326.

Then, the control portion 41 projects the stripe pattern light on the projection region R2 at a step S3. Specifically, the control portion 41 projects the stripe pattern light corresponding to the stripe pattern set in the DMD 326 at the step S2 on the projection region R2 from each of the eight projectors 32.

Then, the control portion 41 captures an image at a step S4. Specifically, the control portion 41 acquires the image of the board 110 with the stripe pattern light projected at the step S3.

Then, the control portion 41 determines whether or not the number n of the phase(s) of the stripe pattern light is smaller than 3 at a step S5. When determining that the number n of the phase(s) is smaller than 3, the control portion 41 advances to a step S6. When determining that the number n of the phases is not smaller than 3, on the other hand, the control portion 41 advances to a step S7.

At the step S6, the control portion 41 sets the number n of the phase(s) of the stripe pattern light to n+1 and thereafter returns to the step S2. The control portion 41 repeats the steps S2 to S5 thereby acquiring four images in which the phases are shifted by 2π/4.

At the step S7, the control portion 41 calculates the phases. Specifically, the control portion 41 calculates phase values corresponding to the images captured at the numbers n (n=0 to 3, for example) of the phases from the images for respective parts of the board 110.

Then, the control portion 41 detects the height of the board 110 at a step S8. Specifically, the control portion 41 detects the height of each part of the board 110 on the basis of the information about the phase values corresponding to the images calculated at the step S7 and a table associating space coordinates previously stored in the storage portion with the phase values. Furthermore, the control portion 41 performs the various inspections on the board 110 on the basis of this information about the height of the board 110. Thereafter, the control portion 41 terminates the appearance inspection processing.

According to this embodiment, as hereinabove described, the appearance inspecting apparatus 100 is provided with the DMDs 326 each including the plurality of mirrors 326*a* arranged in the diamond pattern. Thus, when the LEDs 323 are arranged with respect to the DMDs 326 in the diamond pattern having the swing axes 326*b* of the plurality of mirrors 326*c* parallel to the sides 326*d* (edges) of the DMDs 326, the traveling direction of the light emitted from the LEDs 323 can be substantially orthogonal to the swing axes 326*b* of the plurality of mirrors 326*c* even in the case where the LEDs 323 are provided within the ranges of the installation widths of the DMDs 326 each having the quadrilateral outer shape in the plan view. Consequently, the light emitted from the LEDs 323 is reflected by the DMDs 326, whereby the stripe pattern light can be projected on the board 110. Thus, an increase in the installation width of the light source unit 321 including the LEDs 323 and the DMDs 326 can be suppressed, unlike the case where DMDs in a lattice pattern are employed and the light sources are arranged at positions separated at prescribed intervals in oblique directions with respect to corners of the DMDs each having a quadrilateral outer shape in a plan view. Therefore, an increase in the outer dimension of the light source unit 321 including the LED 323 and the DMD 326 can be suppressed.

According to this embodiment, as hereinabove described, the DMD 326 is formed in the substantially quadrilateral shape, and the LED 323 is arranged to be opposed to the side 326*d* of the DMD 326 in the quadrilateral shape, being adjacent to the LED 323. Thus, an increase in the installation width of the light source unit 321 in the extensional direction of the side 326*d* of the DMD 326 being adjacent to the LED 323 can be suppressed, and hence the increase in the installation width of the light source unit 321 including the LED 323 and the DMD 326 can be more easily suppressed.

According to this embodiment, as hereinabove described, the DMD 326 is configured to apply the stripe pattern light being inclined at about 45 degrees with respect to the DMD 326 by adjusting the plurality of mirrors 326*a*. Thus, an edge of the stripe pattern light can be rendered substantially linear, and hence the accurate stripe pattern light can be generated, unlike the case where stripe pattern light is inclined at an angle (90 degrees, for example) other than about 45 degrees with respect to the DMD 326.

According to this embodiment, as hereinabove described, the DMD 326 and the LED 323 are configured to be rotatable about the normal line 300 substantially perpendicular to the reflection surfaces 326*c* of the plurality of mirrors 326*a*. Thus, the pitch (interval) between the adjacent light portions (dark portions) of the stripe pattern light in the height direction in the case where the board 110 is viewed from the side surface can be reduced, and hence the resolution (measurement accuracy) of the three-dimensional shape measurement can be improved.

According to this embodiment, as hereinabove described, the DMD 326 and the LED 323 are configured to be rotatable by about 45 degrees about the normal line 300. Thus, the pitch (interval) between the adjacent light portions (dark portions) of the stripe pattern light in the height direction in the case where the board 110 is viewed from the side surface can be reduced while a large change in the shape of the projection region R2 is suppressed.

According to this embodiment, as hereinabove described, the DMD 326 and the LED 323 are configured to be rotatable about the normal line 300 and rotate independently of the projection lens 327. Thus, the DMD 326 and the LED 323 can be rotated about the normal line 300 of the mirrors 326*a* while the positional relationship between the DMD 326, the projection lens 327, and the projection region R2 is maintained, and hence the Scheimpflug principle allowing the projection lens 327 to focus on a close object and a distance object simultaneously can be maintained. Consequently, the optical system may not be adjusted even in the case where the DMD 326 and the LED 323 are rotated.

According to this embodiment, as hereinabove described, the appearance inspecting apparatus 100 is provided with the plurality of mirrors 326*a* each formed in the substantially quadrilateral shape and having the swing axes 326*b* at the positions corresponding to the diagonals. Furthermore, the plurality of swing axes 326*b* are configured to be substantially parallel to each other and be substantially parallel to the side of the DMD 326 opposed to the LED 323. In addition, the LED 323 and the DMD 326 are arranged such that the traveling direction of the light emitted from the LED 323 is substantially orthogonal to the swing axes 326*b* of the mirrors 326*a*. Thus, the DMD 326 in the diamond pattern in which the swing axes 326*b* for swinging the DMD 326 are parallel to the side 326*d* (edge) of the DMD 326 having a quadrilateral outer shape is provided, whereby the traveling direction of the light emitted from the LED 323 can be substantially orthogonal to the swing axes 326*b* of the plurality of mirrors 326*a*. Therefore, the light emitted from the LED 323 is reflected by the DMD 326, whereby the stripe pattern light can be easily projected on the board 110.

According to this embodiment, as hereinabove described, the appearance inspecting apparatus 100 is provided with the fitting portion 329 configured to mount the DMD 326 and the LED 323 on the projector housing 322, and the DMD 326 and the LED 323 are mounted on the fitting portion 329 to be rotatable about the normal line 300 and be rotatable independently of the projection lens 327. Thus, the DMD 326 and the LED 323 can be easily rotated about the normal line 300 of the mirrors 326a of the DMD 326 with respect to the projection lens 327 while the positional relationship between the DMD 326 and the LED 323 is maintained due to the fitting portion 329.

According to this embodiment, as hereinabove described, each of the plurality of projectors 32 is configured such that the optical axis of the projection lens 327 is set to include the imaging region R1 of the imaging portion 31 in the projection region R2. Thus, all images corresponding to the stripe pattern light emitted from the plurality of projectors 32 can be acquired (without omission) even in the case where the plurality of projectors 32 are arranged.

According to this embodiment, as hereinabove described, the projectors 32 each have the DMD 326 configured to be relatively movable parallel to the projection lens 327 such that the center (centerline 500) of the DMD 326 in the plan view is shifted with respect to the optical axis of the projection lens 327. Thus, the position of the DMD 326 relative to the projection lens 327 is changed, whereby the projection region R2 of each of the projectors 32 can include the imaging region R1 of the imaging portion 31 even in the case where the projection region R2 of each of the projectors 32 and the imaging region R1 of the imaging portion 31 are displaced from each other. Therefore, all the images corresponding to the stripe pattern light emitted from the projectors 32 can be easily acquired (without omission).

According to this embodiment, as hereinabove described, the DMDs 326 and the LEDs 323 of the four projectors 32 arranged at the positions (positions C1 to C4) inclined at about 45 degrees with respect to the side of the imaging region R1 of the eight projectors 32 are rotated by about 45 degrees about the normal line 300 substantially perpendicular to the reflection surfaces 326c of the plurality of mirrors 326a. Thus, the projection region R2 of each of the four projectors 32 arranged at the positions C1 to C4 can include the imaging region R1 of the imaging portion 31 without increasing the projection magnification of the projection lens 327, and hence a reduction in the resolution of the stripe pattern light projected on the projection region R2 can be suppressed. Furthermore, the projection region R2 of each of the four projectors 32 arranged at the positions C1 to C4 can include the imaging region R1 of the imaging portion 31 without increasing the projection magnification of the projection lens 327, and hence a reduction in the luminance of the stripe pattern light projected on the projection region R2 can be suppressed.

According to this embodiment, as hereinabove described, the DMDs 326 and the LEDs 323 are rotated by about 90 degrees about the normal line 300 of the plurality of mirrors 326a with respect to the DMDs 326 and the LEDs 323 of the projectors 32 arranged at the positions B1 and B2 opposed to the long sides of the imaging region R1 so as to be arranged when the projectors 32 are arranged at the positions A1 and A2 opposed to the short sides of the imaging region R1, and the DMDs 326 and the LEDs 323 are rotated by about 45 degrees about the normal line 300 of the plurality of mirrors 326a with respect to the DMDs 326 and the LEDs 323 of the projectors 32 arranged at the positions B1 and B2 so as to be arranged when the projectors 32 are arranged at the positions C1 to C4 inclined at about 45 degrees with respect to the long sides of the imaging region R1. Thus, the DMDs 326 and the LEDs 323 at the prescribed positions are rotated by the prescribed angle (about 45 degrees or about 90 degrees, for example) about the normal line 300 of the plurality of mirrors 326a with respect to the DMDs 326 and the LEDs 323 of the projectors 32 arranged at the positions B1 and B2, whereby the projection region R2 of each of the projectors 32 can easily include the imaging region R1 without increasing the projection magnification of the projection lens 327.

According to this embodiment, as hereinabove described, the DMDs 326 are configured to apply the stripe pattern light to the board 110 such that the light intensity is larger on the farther sides from the projectors 32 than on the closer sides therefrom. Thus, the smaller luminance of the stripe pattern light applied to the projection regions R2 on the farther sides from the projectors 32 than on the closer sides therefrom can be suppressed, and hence the luminance of the stripe pattern light on the projection regions R2 can be uniform.

According to this embodiment, as hereinabove described, the DMDs 326 are configured to display the black color on the region R3 outside the imaging region R1 of the imaging portion 31 by not applying the stripe pattern light thereto. Thus, diffused reflection of the projected stripe pattern light from the projection region R2 around the imaging region R1 can be suppressed, and hence the measurement accuracy of the appearance inspecting apparatus 100 can be improved.

According to this embodiment, as hereinabove described, the imaging portion 31 is configured to be capable of changing the position of the imaging region R1, and the DMDs 326 each are configured to be rotatable about the normal line 300 such that the projection region R2 includes the imaging region R1 whose position can be changed. Thus, even in the case where the position of the imaging region R1 of the imaging portion 31 is changed, the projection region R2 can include the imaging region R1 whose position can be changed by a simple operation of rotating each of the DMDs 326, and hence all the images corresponding to the stripe pattern light can be easily acquired (without omission).

The embodiment disclosed this time must be considered as illustrative in all points and not restrictive. The range of the present disclosure is shown not by the above description of the embodiment but by the scope of claims for patent, and all modifications within the meaning and range equivalent to the scope of claims for patent are further included.

For example, while the present disclosure is applied to the appearance inspecting apparatus inspecting the board (inspection target portion) as the example of the three-dimensional shape measuring apparatus in the aforementioned embodiment, the present disclosure is not restricted to this. The present disclosure is applicable to another three-dimensional shape measuring apparatus such as an extraneous material inspecting apparatus, a solder printing inspecting apparatus, or a component inspecting apparatus.

While the DMDs (digital mirror devices) and the LEDs (light sources) at the positions C1 to C4 are rotated by about 45 degrees about the normal line of the mirrors so as to be arranged in the aforementioned embodiment, the present disclosure is not restricted to this. According to the present disclosure, the digital mirror devices and the light sources at the positions C1 to C4 may alternatively be rotated by an angle other than 45 degrees about the normal line of the mirrors or may not be rotated about the normal line of the mirrors.

While the LEDs are employed as the light source according to the present disclosure in the aforementioned embodiment, the present disclosure is not restricted to this. According to the present disclosure, laser beam sources other than the LEDs may alternatively be provided as the light source, for example.

While the DMDs are moved parallel to the projection lenses such that the centerlines 500 of the DMDs in the plan view are shifted with respect to the optical axes of the projection lenses in the aforementioned embodiment, the present disclosure is not restricted to this. According to the present disclosure, the projection lenses may alternatively be moved parallel to the DMDs such that the optical axes of the projection lenses are shifted with respect to the centerlines 500 of the DMDs in the plan view, or both the projection lenses and the DMDs may alternatively be relatively moved parallel to each other such that the centerlines 500 of the DMDs in the plan view and the optical axes of the projection lenses are shifted with respect to each other.

While the plurality of projectors are provided at the positions inclined at about 45 degrees with respect to each other about the center of the imaging portion as viewed from above in the aforementioned embodiment, the present disclosure is not restricted to this. According to the present disclosure, the plurality of projectors may alternatively be provided at positions inclined at an angle other than about 45 degrees with respect to each other about the center of the imaging portion.

While the stripe pattern light is emitted to the inspection target portion such that the light intensity is larger on the farther sides from the projectors than on the closer sides therefrom in the aforementioned embodiment, the present disclosure is not restricted to this. According to the present disclosure, the stripe pattern light may alternatively be emitted to the inspection target portion such that the light intensity is substantially uniform on the farther sides from the projectors and the closer sides therefrom.

While no stripe pattern light is emitted to the region outside the imaging region in the aforementioned embodiment, the present disclosure is not restricted to this. According to the present disclosure, the stripe pattern light may alternatively be emitted also to the region outside the imaging region.

While the optical axes of the projection lenses are set such that the projection regions include the imaging region of the imaging portion in the aforementioned embodiment, the present disclosure is not restricted to this. According to the present disclosure, the projection magnifications of the projection lenses may alternatively be set or both the projection magnifications and the optical axes of the projection lenses may alternatively be set such that the projection regions include the imaging region of the imaging portion.

While the DMDs and the LEDs (light sources) are manually rotated about the normal line of the plurality of mirrors constituting the DMDs and are moved parallel to the lens surfaces of the projection lenses in the aforementioned embodiment, the present disclosure is not restricted to this. According to the present disclosure, motors may alternatively be provided in the projectors 32, and the DMDs and the light sources may alternatively be rotated about the normal line of the plurality of mirrors constituting the DMDs by the power of the motors and be moved parallel to the lens surfaces of the projection lenses.

While the DMDs and the LEDs (light sources) are rotated clockwise in the aforementioned embodiment, the present disclosure is not restricted to this. According to the present disclosure, the DMDs and the light sources may alternatively be rotated counterclockwise.

While the processing performed by the control portion is described, using the flowchart described in a flow-driven manner in which processing is performed in order along a processing flow for the convenience of illustration in the aforementioned embodiment, the processing performed by the control portion may alternatively be performed in an event-driven manner in which processing is performed on an event basis, for example. In this case, the processing performed by the control portion may be performed in a complete event-driven manner or in a combination of an event-driven manner and a flow-driven manner.

What is claimed is:

1. A three-dimensional shape measuring apparatus comprising:
    a light source;
    a digital mirror device including a plurality of mirrors arranged in a diamond pattern and applying stripe pattern light alternately including a light portion and a dark portion with which information about a height of an inspection target portion is acquired, by reflecting light emitted from the light source using the plurality of mirrors; and
    an imaging portion imaging the inspection target portion to which the digital mirror device applies the stripe pattern light,
    the digital mirror device is configured to apply the stripe pattern light inclined at about 45 degrees with respect to the digital mirror device by adjusting the plurality of mirrors.

2. The three-dimensional shape measuring apparatus according to claim 1, wherein
    the digital mirror device has a polygonal shape, and
    the light source is configured to be opposed to a side of the digital mirror device having the polygonal shape, adjacent to the light source.

3. The three-dimensional shape measuring apparatus according to claim 1, wherein
    the digital mirror device and the light source are configured to be rotatable about a normal line substantially perpendicular to reflection surfaces of the plurality of mirrors.

4. The three-dimensional shape measuring apparatus according to claim 3, wherein
    the digital mirror device and the light source are configured to be rotatable by about 45degrees about the normal line.

5. The three-dimensional shape measuring apparatus according to claim 3, further comprising a projection lens, wherein
    the digital mirror device and the light source are configured to be rotatable about the normal line and rotate independently of the projection lens.

6. The three-dimensional shape measuring apparatus according to claim 1, further comprising a projector including the light source and the digital mirror device, emitting the stripe pattern light to a prescribed projection region, wherein
    the plurality of mirrors each are formed in a substantially quadrilateral shape and have swing axes at positions corresponding to diagonals of substantially quadrilateral shapes,
    a plurality of the swing axes are configured to be substantially parallel to each other and be substantially parallel to a side of the digital mirror device opposed to the light source, and
    the light source and the digital mirror device are arranged such that a traveling direction of the light emitted from the light source is substantially orthogonal to the swing axes of the mirrors.

7. The three-dimensional shape measuring apparatus according to claim 6, further comprising a mounting portion configured to mount the digital mirror device and the light source on a projector housing, wherein the digital mirror device and the light source are mounted on the mounting portion to be rotatable about a normal line and be rotatable independently of the projection lens.

8. The three-dimensional shape measuring apparatus according to claim 6, wherein
the projector has a projection lens,
a plurality of projectors are arranged to surround the imaging portion as viewed from above, and
each of the plurality of projectors is configured such that at least a projection magnification of the projection lens or an optical axis of the projection lens is set to include an imaging region of the imaging portion in the projection region.

9. The three-dimensional shape measuring apparatus according to claim 6, wherein
the projector has a projection lens, and
the projector has the digital mirror device and the projection lens configured to be relatively movable parallel to each other such that a center of the digital mirror device in a plan view and an optical axis of the projection lens are shifted with respect to each other.

10. The three-dimensional shape measuring apparatus according to claim 6, wherein
the imaging portion is configured to be capable of imaging the inspection target portion in an imaging region having a substantially quadrilateral shape,
a plurality of projectors are arranged to surround the imaging portion as viewed from above, and
the digital mirror device and the light source of the projector arranged at a position inclined at a prescribed angle with respect to a side of the imaging region of the plurality of projectors are rotated by an angle corresponding to the position inclined at the prescribed angle where the projector is arranged about a normal line substantially perpendicular to reflection surfaces of the plurality of mirrors.

11. The three-dimensional shape measuring apparatus according to claim 10, wherein
the imaging portion is configured to be capable of imaging the inspection target portion in the imaging region having a substantially rectangular shape,
the digital mirror device and the light source are rotated by about 90 degrees about the normal line substantially perpendicular to the reflection surfaces of the plurality of mirrors with respect to the digital mirror device and the light source of the projector arranged at a position opposed to a long side of the imaging region so as to be arranged when the projector is arranged at a position opposed to a short side of the imaging region, and
the digital mirror device and the light source are rotated by about 45 degrees about the normal line substantially perpendicular to the reflection surfaces of the plurality of mirrors with respect to the digital mirror device and the light source of the projector arranged at the position opposed to the long side of the imaging region so as to be arranged when the projector is arranged at a position inclined at about 45 degrees with respect to the long side of the imaging region.

12. The three-dimensional shape measuring apparatus according to claim 6, wherein
the digital mirror device is configured to apply the stripe pattern light to the inspection target portion such that light intensity is larger on a farther side from the projector than on a closer side therefrom.

13. The three-dimensional shape measuring apparatus according to claim 1, wherein
the digital mirror device is configured to display a black color on a region outside an imaging region of the imaging portion by not applying the stripe pattern light thereto.

14. The three-dimensional shape measuring apparatus according to claim 3, wherein
the imaging portion is configured to be capable of changing a position of an imaging region, and
the digital mirror device is configured to be rotatable about the normal line such that the projection region includes the imaging region whose position is changed.

* * * * *